March 18, 1952  L. PEARMAN ET AL  2,589,957
APPARATUS FOR SEPARATING PRODUCTS
Filed Feb. 5, 1948  6 Sheets-Sheet 1
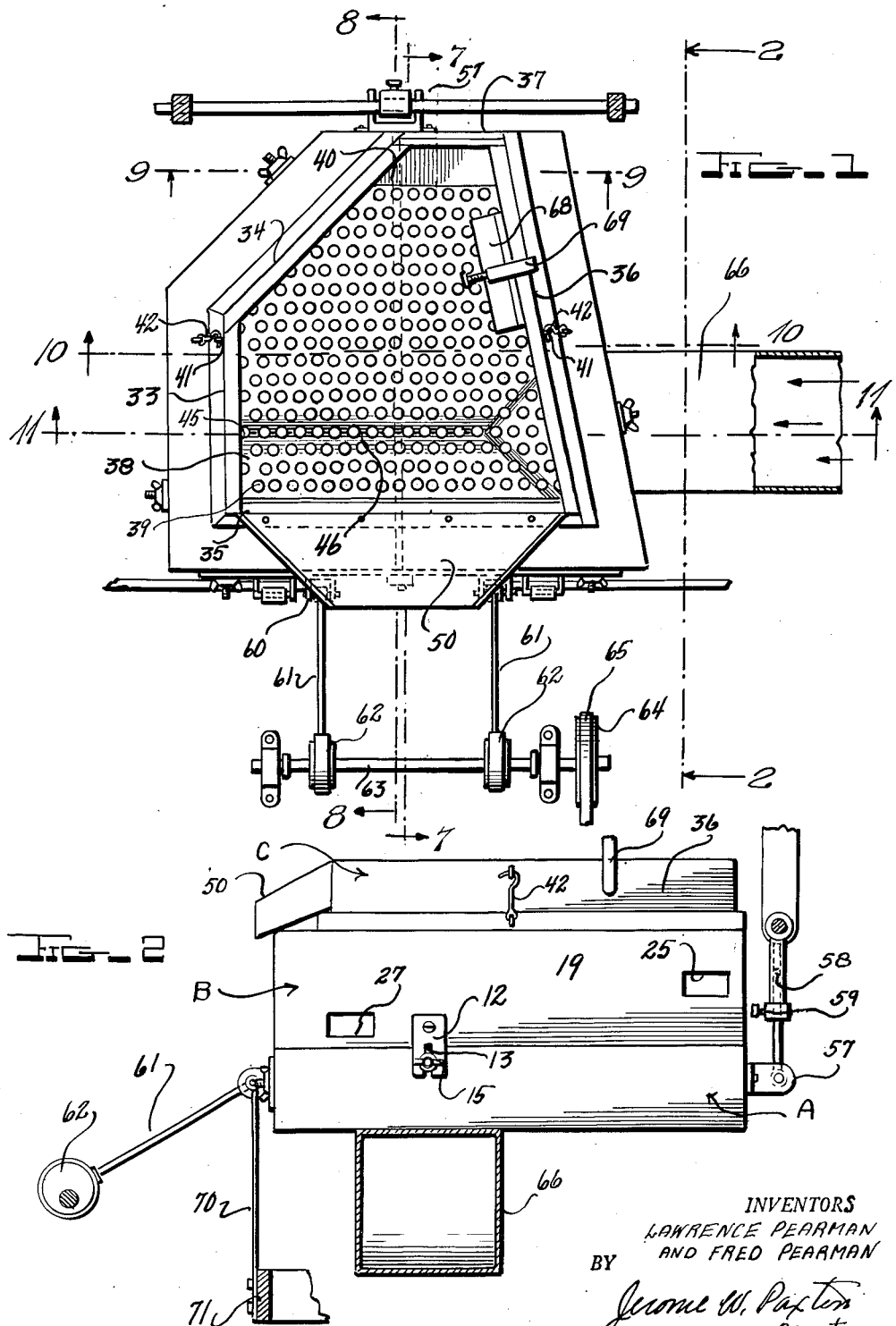
INVENTORS
LAWRENCE PEARMAN
AND FRED PEARMAN
BY Jerome W. Paxton
Agent.

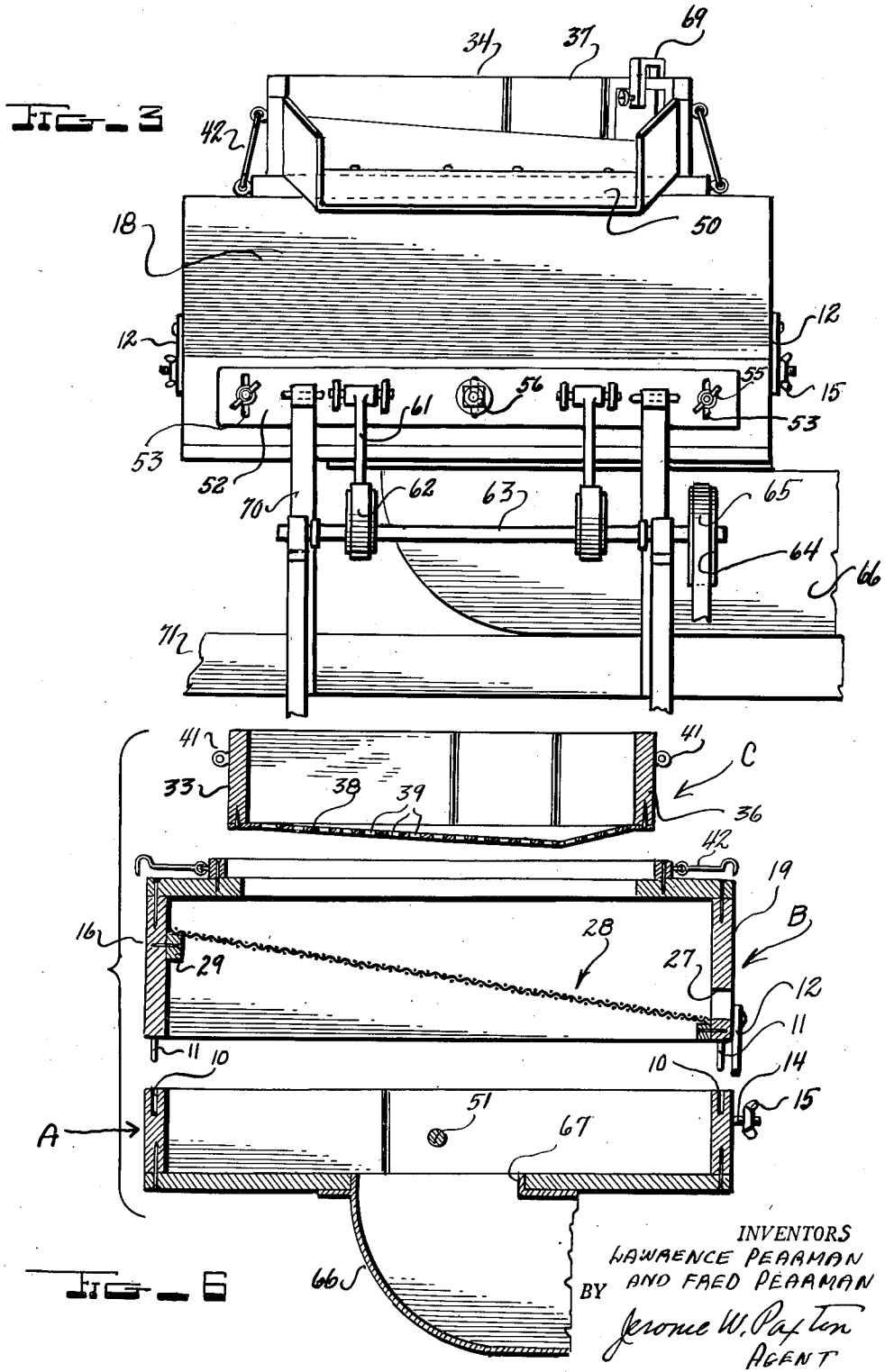

March 18, 1952     L. PEARMAN ET AL     2,589,957
APPARATUS FOR SEPARATING PRODUCTS
Filed Feb. 5, 1948     6 Sheets-Sheet 3

INVENTORS
LAWRENCE PEARMAN
AND FRED PEARMAN
BY Jerome W. Paxton
Agent

March 18, 1952  L. PEARMAN ET AL  2,589,957
APPARATUS FOR SEPARATING PRODUCTS
Filed Feb. 5, 1948  6 Sheets-Sheet 4
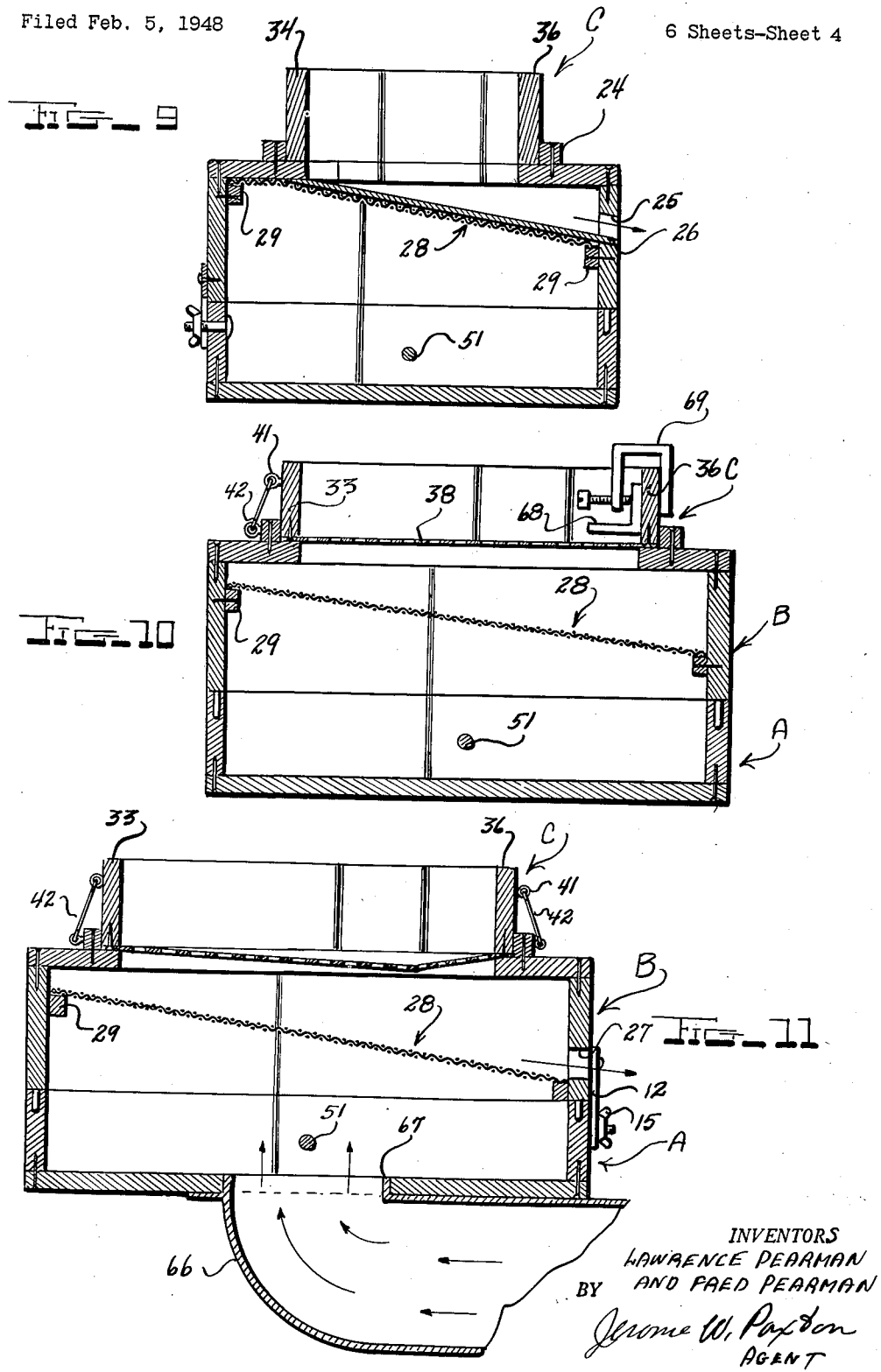
INVENTORS
LAWRENCE PEARMAN
AND FRED PEARMAN
BY Jerome W. Paxton
AGENT

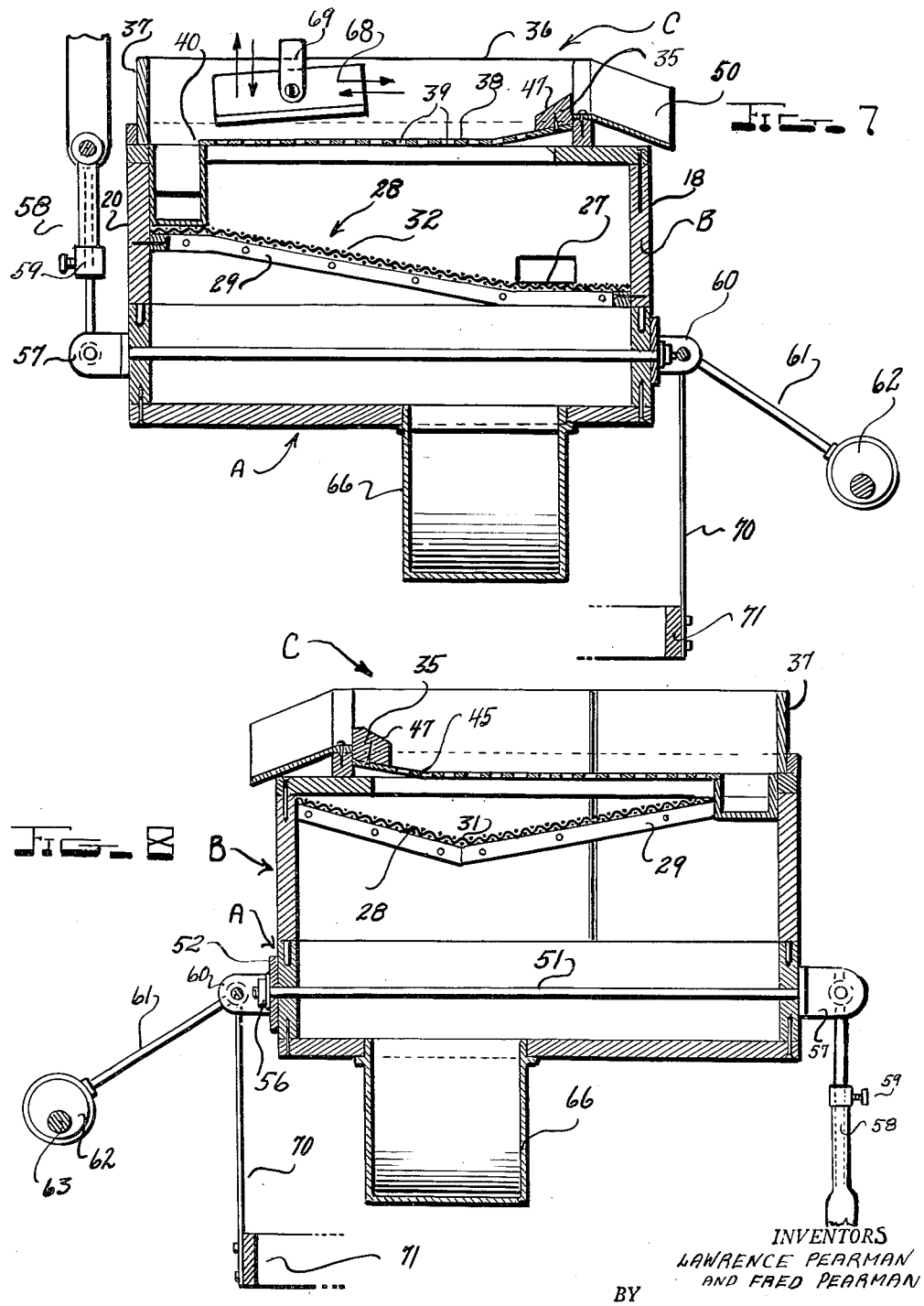

March 18, 1952 L. PEARMAN ET AL 2,589,957
APPARATUS FOR SEPARATING PRODUCTS
Filed Feb. 5, 1948 6 Sheets-Sheet 6
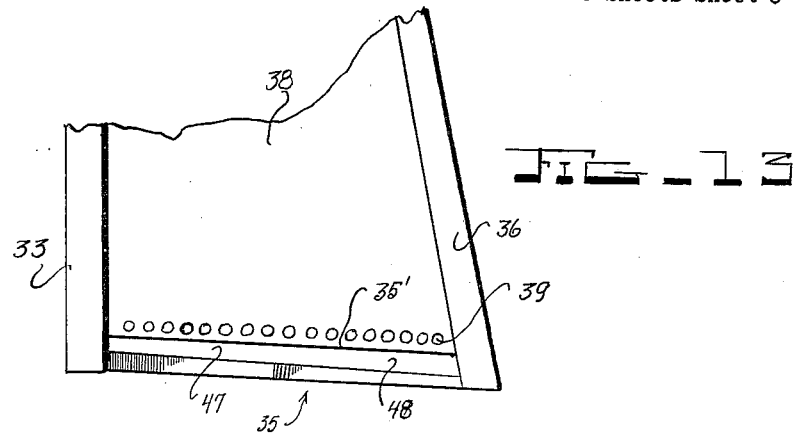
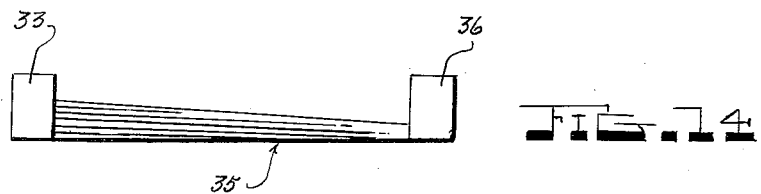
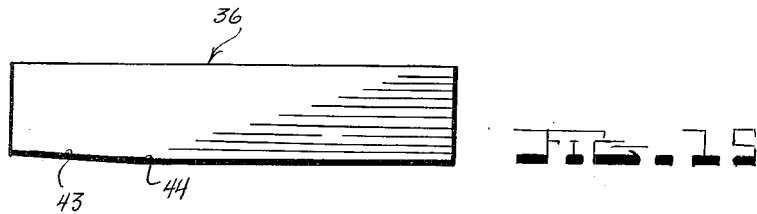
Inventors
LAWRENCE PEARMAN
AND FRED PEARMAN
By Jerome W. Payton
AGENT Patented Mar. 18, 1952

2,589,957

UNITED STATES PATENT OFFICE 2,589,957

APPARATUS FOR SEPARATING PRODUCTS

Lawrence Pearman and Fred Pearman,
Chula, Ga.

Application February 5, 1948, Serial No. 6,428

7 Claims. (Cl. 209—28)

The present invention relates to a method and apparatus for separating products of varying degree in size and quality, and more particularly relates to a method and apparatus for separating and grading edible products, such as peanuts, legumes, seeds, and similar types of commodities.

It is well recognized that it has been difficult to separate properly, products of the above mentioned character. For example, in the case of separating and grading peanuts, the machines in use often permit both shelled and unshelled peanuts, as well as splits and rots, to leave the machine through the same exit. The disadvantage of this procedure is obvious, since it necessitates additional separating steps in order to properly and correctly grade the various types of products, with the attendant high cost of operation. Generally, the separating machines in use employ three zones identified light, medium and heavy. The light zone is supposed to consist of only undesirable material, but invariably a small percentage of desirable material is present in this zone. In the medium zone, there is found both desirable and undesirable products, and the heavy zone is supposed to contain only desirable material, but, as an actual fact, this zone is seldom free of undesirable material. Hence, there is never a complete separation of the desirable material, and the apparatus consequently continually operates on the same material. To our knowledge, there are no machines currently in use which will separate shelled nuts from unshelled nuts, healthy nuts from splits and rots, and will also grade nuts according to different sizes.

An object of our invention is to provide a method and apparatus for separating products of the type described which is not open to the objectionable features now present in the art.

Another object of this invention is to provide a method and apparatus wherein a complete separation of the shelled product from the unshelled product is accomplished and the undesirable material is eliminated in the initial phase of operation.

A further object of the present invention is to provide means for separating a mass of products of varying size and quality, wherein the mass has imparted thereto a counterclockwise circular motion when admitted into the separating means whereby the unshelled product in the case of peanuts, the rots and splits leave the separating machine for return to the shelling mechanism and the healthy and desirable products leave the machine through the outlets therefrom.

Yet a further object of the present invention is to provide a separating apparatus for commodities such as nuts, with means where the nuts of different size may be eliminated from the machine through at least two different outlets.

And another object of our invention is to provide a separating apparatus for peanuts and the like, wherein the separating plate is so designed as to permit the grading of the various sized nuts and cause the nuts to leave the machine through different outlets.

An additional object of this invention is to provide a separating apparatus of the character described wherein adjustable means is incorporated therewith for controlling the air pressure to which the products are subjected to insure that undesirable or unwanted products are not eliminated from the machine through the outlet openings.

A further object of this invention is to provide a separating apparatus for separating and grading products from a mass of products varied in size and quality which is simple in structural details, positive and efficient in operation, and capable of being cheaply and easily manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a top plan view of the separating apparatus constructed in accordance with the present invention.

Figure 2 is a sectional view taken along the line 2—2 of Figure 1, looking in the direction of the arrows.

Figure 3 is a front elevational view of the separating apparatus.

Figure 4 is a plan view on an enlarged scale of the intermediate section, with the deck or upper section removed.

Figure 5 is a plan view of the base section partly broken away and in section.

3

Figure 6 is a sectional view showing the deck and base section in disassembled form.

Figure 7 is a sectional view taken along the line 7—7 of Figure 1, looking in the direction of the arrows.

Figure 8 is a sectional view taken along the line 8—8 of Figure 1, looking in the direction of the arrows.

Figure 9 is a sectional view taken along the line 9—9 of Figure 1, looking in the direction of the arrows.

Figure 10 is a sectional view taken along the line 10—10 of Figure 1, looking in the direction of the arrows.

Figure 11 is a sectional view taken along the line 11—11 of Figure 1, looking in the direction of the arrows.

Figure 12 is a view in perspective of the baffle plate or block adjustably connected to the deck for controlling the air pressure.

Figure 13 is a fragmentary plan view of the deck.

Figure 14 is an end view of that portion of the deck illustrated in Figure 13.

Figure 15 is an elevational view of one of the walls of the deck.

Referring to the drawings and more particularly to Figure 6, the separating apparatus includes a base section A, an intermediate section B, and a deck or upper section C. The base section A is provided with a plurality of bores or apertures 10, into which a plurality of corresponding pins 11 carried by the intermediate section B are adapted to fit for maintaining the base and intermediate sections in proper vertical alinement. The section B has suitably secured to the side walls thereof, a plurality of straps 12, each of which is provided with a vertical slot 13 which engages a corresponding bolt and nut assembly 14 carried by the side walls of the base section A. Manifestly, when wing nuts 15 are drawn up on the respective bolts, the intermediate section B will be fastly secured to the base section A.

Referring to Figures 4 and 5, it can be seen that the base section A and the intermediate section B when assembled provide a housing or casing which is polygonal in outline. For the purpose of simplicity, the wall construction will be confined to the intermediate section B, since, of course, the walls of the base section A coincide therewith when the respective sections are secured together. More specifically, the intermediate section B includes side wall 16, and wall 17 extends therefrom at an angle of approximately 138 degrees. Secured to the opposite end of the wall 16 and extending therefrom at 90 degrees is wall 18. Wall 19 is secured to the free end of the wall 18 at an angle of approximately 79 degrees, and a fifth wall 20 is attached to the free extremities of the walls 17 and 19. The joints between the side walls above discussed may be made in any suitable manner. As will later be more fully discussed, the angular relationship of these walls is important to the efficient operation of the machine. The upper end of the intermediate section B carries a horizontally extending supporting surface 21 which is recessed or cut away, as shown at 22. The walls of the recess 22 are parallel to the walls of the intermediate section or member B. Also extending parallel to the side walls of the intermediate member B is an upstanding member 24. As perhaps more clearly shown in Figures 5 and 11, the upstanding member 24 is spaced a substan-

4 tial distance from the side walls of the intermediate section B along the walls 16, 17, 18 and 19, thereby providing a shelf or border between the upstanding member and the side walls. Furthermore, the upstanding member 24 is spaced from the cut-out portion 22 a sufficient distance to provide a ledge for supporting the deck C, as will hereinafter be more specifically set forth. The upstanding member 24 is preferably made of individual wall sections suitably secured together, although a single member of this configuration may be utilized. The member 24 is attached to the supporting surface 21 by nails or the like. The wall 19 of the intermediate section B is provided with an outlet opening, preferably of rectangular configuration, identified 25, adjacent the wall 20 and located near the upper edge of the wall 19. A metallic trough-like member 26 is secured near its inner end to the under face of the supporting surface 21 and at its opposite or outer end to the lower wall of the opening 25. As will later become more fully apparent, the trough 26 and the outlet 25 function to enable certain of the separated products to leave the machine.

A second outlet 27 is also formed in the wall 19 in proximity to the junction of the wall 19 and wall 18 and is disposed in a horizontal plane considerably lower than that of the opening 25, as perhaps more clearly shown in Figure 2. This opening serves as a exit point for products of a different size leaving the opening 25.

A screen or grid-like member 28 is positioned within the side walls of the intermediate section B and may be secured therein by tacking or stapling the free edges of the member 28 to nailing strips 29 conveniently attached to the inner faces of the walls of the intermediate section. The outside edges of the grid-like member 28 are parallel to the side walls of the intermediate section B. The edge of the member 28 which extends along wall 16, and which is designated 30, tapers downwardly to point 31 from the point of juncture of the wall 16 to the wall 18, the taper being approximately 4 degrees, as perhaps best shown in Figure 8. The edge of the member 28 which extends along wall 19 is inclined downwardly from beneath the trough 26, as shown at 32 in Figure 7, to a point flush with the lower face of the opening 27 and thence extends to the wall 18. That edge of the grid-like member 28 adjacent the wall 18 is inclined upwardly to its point of juncture with the edge extending along the side wall 16. Manifestly, the grid-like member 28 is so inclined as to assure that all products deposited thereon will move toward the outlet 27.

Referring now to the deck member C, this member is likewise polygonal in configuration and is of such size as to be fitted within the corresponding opening or recess defined by the vertical member 24 and be supported therein on the ledge. The deck likewise includes a side wall 33 to which side wall 34 is secured at approximately 138 degrees. Side wall 35 is attached to the side wall 33 and extends therefrom at an angle of approximately 90 degrees and is of considerably less height, as shown in Figure 3. Wall 36 is attached to and extends from the free end of the wall 35 at 79 degrees, and the free ends of the walls 34 and 36 are joined by wall 37. A metallic plate 38 provided with a plurality of apertures 39 of equal diameter is secured to the lower edges of the side walls. The end of the plate 38 adjacent the wall 37 is cut away to provide an opening 40 which is in communication with the trough 26 attached to the intermediate section B. We might add that the metallic plate 38 is so secured to the side walls as to permit plates having apertures of varying size to be interchanged to compensate for the various sizes of the products being separated. To insure that the deck C will be maintained in proper position on the intermediate section B, it will be observed that eyes 41 are attached to the walls 33 and 36 to cooperate with hooks 42 carried by the supporting surface 21.

The side wall 36 from its point of juncture with the wall 35 tapers approximately 4 degrees to a point designated 43 and from this point to a point designated 44. The taper is about 1 degree 36 minutes from which the wall extends horizontally to its connection to the wall 37. Similarly, the wall 33 is inclined downwardly from its connection to the wall 35 to a point 45 at substantially 4 degrees. The purpose of providing these particular tapers on the walls 33 and 36 will cause the metal plate 38 to have a slight crease, as designated by the numeral 46, whereby the capacity of the machine is increased. The crease will cause the section of the plate 38 from point 46 to wall 35 to flatten out to a substantial horizontal position, thereby preventing too thick a layer of nuts from accumulating at the wall 35. It has been found that if too thick a layer of the products accumulates at wall 35, it will have too much weight for the air to make the mass fluid. By thus preventing the mass from gathering at the wall 35 permits a greater volume of nuts to be introduced into the deck.

The height of the wall 35 tapers downwardly from its connection to the wall 33 to its point of juncture with the wall 36, and the upper surface of the wall is beveled toward the inner face thereof, as indicated at 47. The length of the beveled surface increases in proportion to the decrease in height of the wall toward its connection to the side wall 36, as indicated at 48. More specifically, the bevel 47 on the wall 35 assists in the elimination of unwanted material over the wall, while the low perpendicular side 35' keeps the heavy, sound nuts from becoming stationary on the plate 38 adjacent the wall. As will later become more fully apparent, the reciprocating movement of wall 35 and the perpendicular side 35' imparts a striking force against the unwanted mass, which, in turn, transfers this force to the sound nuts which assists these latter nuts in their movement of travel toward the opening 40. The bevel 47 will allow the unwanted material which has accumulated above the height of the side 35' to be discharged thereover into a chute 50 secured to the upstanding member 24 by nails or the like.

It will be noted that a rod 51 extends through alined openings in the walls of the base section A corresponding to the walls 18 and 20 of the intermediate section B, and the rod is parallel to the wall 16 of the intermediate section and the wall 33 of the deck C. One end of the rod 51 extends through an opening provided in a horizontally extending metal strap 52 which is provided with a vertical slot 53 adjacent each end thereof. A bolt 54 disposed in the wall of the base section A extends through each slot 53, and the strap 52 is detachably connected to the wall by manipulation of a wing nut 55. The rod 51 carries a nut 56 for securing the end of the rod to the strap.

The opposite end of the rod 51 has fixed thereto a U-shaped bracket 57 between the legs of which is journaled a brace 58 capable of vertical adjustment through the member 59.

A pair of U-shaped brackets 60 are secured to the metal strap 52, as perhaps best depicted in Figures 5 and 8. A connecting rod 61 is pivoted between the legs of each bracket 60 and carries a cam 62 at the opposite end, the respective cams being mounted on a shaft 63 rotated through pulley 64 connected with any suitable source of power (not shown) by a belt 65.

Compressed air is admitted into the interior of the machine through air conduit 66 which is detachably connected to the walls of an opening 67 formed in the lower wall of the base section A. The conduit 66 is, of course, in communication with a compressor, not illustrated. Sufficient air pressure is maintained to prevent positively any light, undesirable material from dropping through apertures 39 onto the grid 28 and thus intermingling with the sound, heavy nuts which have been discharged through the apertures onto the plate 38.

An important feature of the present machine concerns the horizontally extending surface 21 previously referred to. By this surface it is possible to maintain a reservoir of air from which the air escapes through the apertures 39 along the outer extremities of the plate 38, thereby providing an extra volume of air along the plate near the walls 33, 34, 35 and 36. The direction of oscillation of the machine is parallel to the rod 51 and the walls 34, 35 and 36 are at an angle to the direction of oscillation which assists in keeping the mass away from these walls. This movement will leave the apertures 39 near these walls open to a certain extent which will enable the surplus air under the supporting surface 21 to escape and assist in keeping the mass toward the center of the plate 38 in a counterclockwise circular motion.

We have ascertained that by disposing a baffle plate 68 of angle configuration to the wall 36 of the deck C and securing it in position by means of a clamp 69, it is possible to regulate the air pressure along the wall. In other words, the pressure of the air may be controlled by the height of the baffle with respect to the plate 38. This will tend to prevent any undesirable products from flowing along the wall 36 and thence into the opening 40.

The machine is supported by vertical straps 70 secured at their upper ends to the base section A and at their lower ends to a framework 71 adapted to rest on the floor or other surface. The adjustable brace 58 is also connected at its free end to the frame 71.

The operation of the machine is as follows:

The desired longitudinal elevation is accomplished by loosening the adjustment 59 and either extending or shortening the length of the brace 58, and the crosswise elevation is made by loosening the nuts 55 and shifting the strap 52 on the base section A to the desired elevation. Under operating conditions, it has been determined that the crosswise elevation is approximately 1.6 degrees and more specifically, wall 16 of the intermediate section B is 1.6 degrees higher than the wall 19. The longitudinal elevation is substantially 4 degrees which means that the wall 20 is 4 degrees higher than the wall 18. The baffle 68 is then disposed in proper position on the side wall 36 and by manipulation of the clamp 69 will be fastly secured to the deck C. At this time the motor for driving the pulley 64 through the belt 65 is started, and rocking movement is imparted to the machine by the cam 62 and connecting rods 61. The air compressor is now rendered active and air will be directed into the interior of the machine through the conduit 66 and the opening 67 in bottom of the base A.

The peanuts to be separated, which will include shelled, unshelled, rots and splits are introduced into the deck C over the wall 33 in any convenient manner. The best results are afforded when the mass of products is introduced over the wall 33 at a point approximately three-fourths of the distance from the point of juncture of the wall 33 to the wall 35 toward the joining point of the walls 33 and 34. As the peanuts enter the deck C as indicated, they begin immediately to move over the surface 38 slightly towards the wall 35 and in the general direction of the wall 36, which is due to the fact that the walls 35 and 36 are lower than the point where the products enter, due to the crosswise elevation and the longitudinal elevation of the machine. As the peanuts move toward the wall 35, they are forced to flow away from this wall because of the reciprocating motion of the unit. At the same time, the peanuts continue to move in the direction of the wall 36 and as they near this wall, they are forced to turn and flow alongside the wall 36 in the general direction of the wall 37, thus imparting a counterclockwise rotation to the products. However, as the products move toward the wall 37, the extra pressure of air created by the block 68 will be encountered, which will cause the peanuts to be turned toward the wall 34, thereby imparting another counterclockwise movement to the products. As the products near the wall 34, the angle at which the wall is disposed with respect to the direction of reciprocation of the machine will again effect turning of the products in a counterclockwise direction toward the wall 35, thereby completing the counterclockwise rotation of the products. As this counterclockwise movement continues, the large, sound kernels move closer to the opening 40 to be discharged and at the same time the undesirable products will continue in a counterclockwise direction and with a movement toward the wall 35. During this movement of the products, the pressure of the air emanating through the apertures 39 will cause the light, undesirable products to rise and flow on top of the heavier, sound kernels.

During this cycle, the small, sound nuts which, of course, are heavier than the adjusted air pressure, will fall through the perforations 39 onto the screen 28 and leave the machine through the outlet 27 into a suitable collection receptacle. At the same time, the sound, heavier nuts which are too large to drop through perforations 39 are forced to move along the plate 38 to the opening 40 and drop into the chute 26 for collection at the outlet 25. The reason why the large nuts are able to move as indicated is due to the reciprocating action of the machine and the contact of the nuts with the metal plate 38. The theory respecting the movement of the products in the deck C is thought to be due to the direction of reciprocation of the machine in relation to the angles of the walls 34 and 36. The wall 34 tends to move the mass in a direction toward the junction of the walls 35 and 36 and at the same time the reciprocation of the machine is endeavoring to move the desirable products toward the opening 40. As the reciprocation is attempting to move the material in the direction of the opening 40, the products in contact with the wall 36 are trying to move in the general direction of the junction of the wall 34 to the wall 33 and, as a consequenece, a portion of the desirable products are eliminated in each movement through the outlet 40. While the desirable products are moving towards the outlet 40, the unwanted products are also moving in a counterclockwise direction and not being in contact with the plate 38, these products will move back toward and over the wall 35.

While the brace 58 is shown disposed above its connection to the bracket 57, it is obvious that in operation this brace extends downwardly to the supporting frame as shown in Figure 8.

We claim:

1. In an apparatus for separating products of different sizes and quality, a housing provided with an opening in the upper end thereof, a foraminous member having a plurality of upstanding side walls supported by the housing above the opening in the housing, one of the side walls of the foraminous member being of lesser height than the remaining side walls, the foraminous member having an enlarged opening therein at a point opposite the side wall of lesser height, a chute located beneath said enlarged opening and communicating with an outlet opening in the housing, a transversely and longitudinally inclined grid-like member disposed within the housing beneath said foraminous member in communication with a second outlet opening in the housing, and mechanically actuated means for imparting rocking movement to the housing whereby the products introduced onto the foraminous member have a counterclockwise motion imparted thereto thereby eliminating the undesirable products over the side wall of lesser height, the products of a size sufficient to pass through the foraminous member being discharged through the outlet opening in communication with the grid-like member and the remaining products being collected at the outlet opening in communication with the chute disposed below the elongated opening in the foraminous member, and means to adjust the longitudinal elevation of the housing.

2. In an apparatus for separating products of different sizes and quality, a housing having an opening in the upper end thereof, a foraminous member having a plurality of upstanding side walls supported by the housing above the opening therein, one of the side walls of said foraminous member being of lesser height than the remaining side walls, the foraminous member having an enlarged opening therein at a point opposite the side wall of lesser height, a chute located beneath said enlarged opening and communicating with an outlet opening in the housing, a transversely and longitudinally inclined grid-like member disposed within the housing beneath said foraminous member in communication with a second outlet opening in the housing, means for directing air into the housing for passing upwardly through the grid-like member and foraminous member, additional means on said housing to maintain a reservoir of air along the edges of said foraminous member, and mechanically actuated means for imparting rocking movement to the housing whereby the products introduced onto the foraminous member have a counterclockwise motion imparted thereto thereby eliminating the undesirable products over the side wall of lesser height, the products of a size sufficient to pass through the foraminous member being discharged through the outlet opening in communication with the grid-like member and the remaining products being collected at the outlet opening in communication with the chute disposed below the elongated opening in the foraminous member.

3. In an apparatus for separating products of different sizes and quality, a housing having a recess in the upper end thereof, a foraminous member having a plurality of upstanding side walls, one of said side walls being of lesser height than the remaining side walls, means for detachably connecting the foraminous member to the upper end of the housing above the recess in the housing, the said foraminous member having an enlarged opening therein at a point opposite to the side wall of lesser height, a chute within the housing disposed beneath said enlarged opening and communicating with an outlet in the housing, a grid-like member disposed within the housing beneath said foraminous member in communication with a second outlet in the housing, and mechanically actuated means for imparting rocking movement to the housing whereby the products introduced into the foraminous member have a counterclockwise motion imparted thereto thereby eliminating the undesirable products over the side wall of lesser height, the products of a size sufficient to pass through the foraminous member being discharged through the outlet in communication with the grid-like member and the remaining products being collected at the outlet in communication with the chute disposed below the elongated opening in the foraminous member.

4. In an apparatus for separating products of different sizes and quality, a base having a plurality of side walls, a bottom wall and a top wall provided with an opening therein, a foraminous member having a similar number of side walls adapted to be positioned on the base above the opening in the top wall, one of the side walls of the foraminous member being of lesser height than the remaining side walls, said foraminous member having an enlarged opening therein at a point opposite to the side wall of lesser height, a chute supported by the base disposed beneath the enlarged opening in the foraminous member and communicating with an outlet in one of the side walls of the base, a transversely and longitudinally inclined grid-like member within the base beneath said foraminous member and communicating with a second outlet in the side wall containing the first mentioned outlet, mechanically actuated means for imparting rocking movement to the base whereby the products introduced onto the foraminous member have a counterclockwise motion imparted thereto thereby eliminating the undesirable products over the side wall of lesser height, the products of a size sufficient to pass through the foraminous member being discharged through the outlet opening in communication with the grid-like member and the remaining products being collected at the outlet opening in communication with the chute disposed below the elongated opening in the foraminous member, and means to adjust the longitudinal elevation of said base.

5. In an apparatus for separating products of different sizes and quality, a base having a plurality of side walls, a bottom wall and a top wall provided with an opening therein, a foraminous member having a similar number of side walls adapted to be positioned on the base above the opening in the top wall, one of the side walls of the foraminous member being of lesser height than the remaining side walls, the foraminous member having an enlarged opening therein at a point opposite to the side wall of lesser height, a chute supported by the base disposed beneath the enlarged opening in the foraminous member and communicating with an outlet in one of the side walls of the base, a transversely and longitudinally inclined grid-like member within the base beneath said foraminous member and communicating with a second outlet in the side wall containing the first mentioned outlet, means for introducing air into the base, said top wall being of such dimensions as to maintain a reservoir of air along the edges of said foraminous member and mechanically actuated means for imparting rocking movement to the base whereby the products introduced onto the foraminous member have a counterclockwise motion imparted thereto thereby eliminating the undesirable products over the side wall of lesser height, the products of a size sufficient to pass through the foraminous member being discharged through the outlet opening in communication with the grid-like member and the remaining products being collected at the outlet opening in communication with the chute disposed below the elongated opening in the foraminous member.

6. An apparatus for separating products of different sizes and quality comprising a housing having an opening in the upper end thereof, a foraminous member adapted to be disposed upon the housing above the opening in the upper end and provided with a discharge slot, said foraminous member being inclined upwardly toward said discharge slot, a chute located within the housing beneath the discharge slot communicating with an outlet in one of the walls of the housing, a grid-like member disposed within the housing beneath the foraminous member in communication with a second outlet in the same side wall as the first mentioned outlet, and mechanically actuated means for imparting rocking movement to the housing whereby the products introduced onto the foraminous member have a counterclockwise motion imparted thereto thereby eliminating the undesirable products, the products of a size sufficient to pass through the foraminous member being discharged through the outlet opening in communication with the grid-like member and the remaining products being collected at the outlet opening in communication with the chute disposed below the elongated opening in the foraminous member.

7. An apparatus for separating products of different sizes and quality comprising a housing having an opening in the upper end thereof, a foraminous member having upstanding side walls, one of the side walls being of lesser height than the remaining side walls detachably supported on the housing above the opening in the upper end thereof, the said foraminous member being provided with an enlarged discharge slot at a point opposite to the side wall of lesser height, a chute within the housing beneath the discharge slot and communicating with an outlet in one of the side walls of the housing, a grid-like member disposed within the housing beneath the foraminous member in communication with a second outlet in the same side wall of the housing as the first mentioned outlet, and mechanically actuated means for imparting rocking movement to the housing whereby the products introduced onto the foraminous member have a counterclockwise motion imparted thereto thereby eliminating the undesirable products over the side wall of lesser height, the products of a size sufficient to pass through the foraminous member being discharged through the second mentioned outlet and the remaining products being collected at the first mentioned outlet.

LAWRENCE PEARMAN.
FRED PEARMAN.

REFERENCES CITED

The following references are of record in the file of this patent:

UNITED STATES PATENTS

| Number | Name | Date |
|---|---|---|
| 214,621 | Charlesworth | Apr. 22, 1879 |
| 370,726 | Case | Sept. 27, 1887 |
| 450,482 | Coxe | Apr. 14, 1891 |
| 940,827 | Sheward | Nov. 23, 1909 |
| 994,280 | Smith | June 6, 1911 |
| 1,241,954 | Furtado | Oct. 2, 1917 |
| 1,252,273 | Lever | Jan. 1, 1918 |
| 1,431,205 | Worth | Oct. 10, 1922 |
| 2,200,472 | Erdmann | May 14, 1940 |
| 2,331,850 | Smith | Oct. 12, 1943 |